United States Patent Office 3,103,829
Patented Sept. 17, 1963

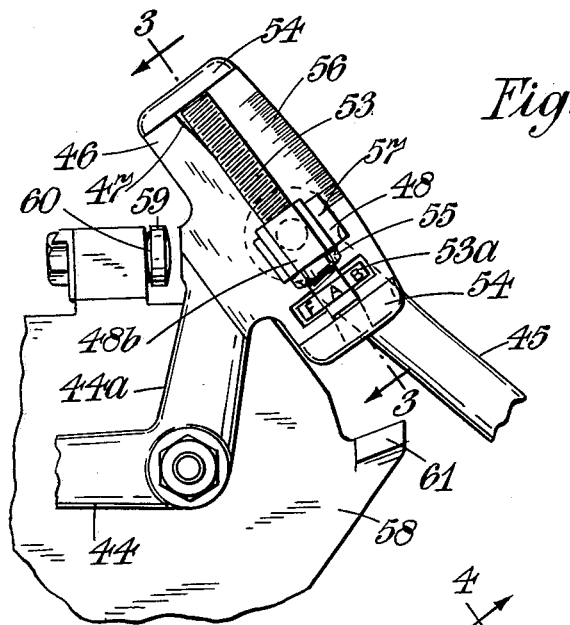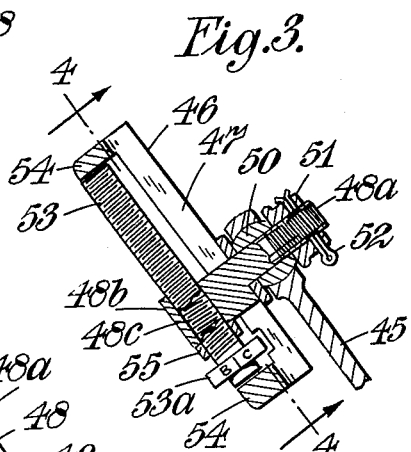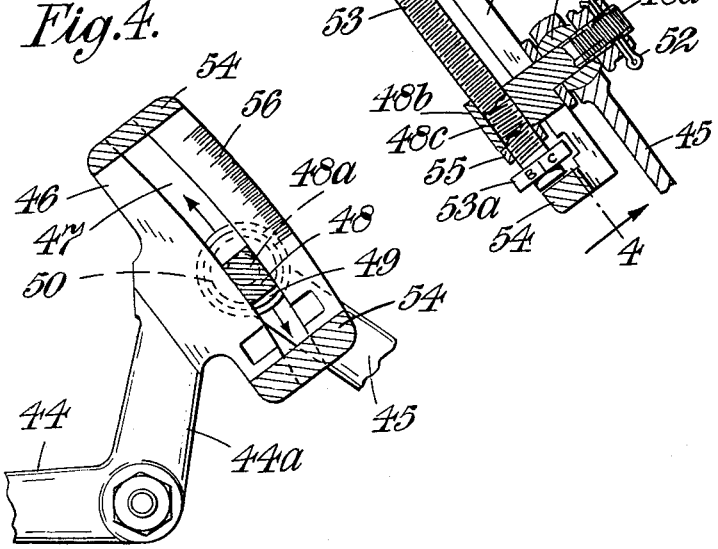

3,103,829
CONTROL LINKAGE ARRANGEMENT FOR GAS TURBINE ENGINE FUEL SYSTEM
Kenneth Arnold Basford, Alvaston, England, assignor to Rolls-Royce Limited, Derby, England, a British company
Filed July 9, 1959, Ser. No. 825,962
Claims priority, application Great Britain July 15, 1958
2 Claims. (Cl. 74—479)

This invention comprises improvements in or relating to gas-turbine engine fuel systems.

It is known that the rate of supply of fuel to a gas-turbine engine to give any particular power output varies with the ambient atmospheric temperature on the ground. Therefore, in order to ensure that a particular setting of the power control lever, by which the power output of an engine is selected, gives substantially the same power output under varying ambient temperature conditions, it has been proposed to provide a further control, known as a day temperature trim control, which is adjusted in accordance with ambient atmospheric temperature to cause an appropriate adjustment of a throttle in the engine fuel system such that, for instance, when the power control lever is set in the position of maximum power output for take-off of an aircraft powered by the engine, the fuel flow to the engine will be appropriate to give maximum power output at the prevailing day temperature.

This invention relates particularly to engine fuel systems in which fuel flow to the engine is adjustable by a day temperature trim control as above set forth, and the invention comprises providing a presettable mechanism whereby the effect on the engine throttle of any given adjustment of the day temperature trim control can be varied to suit the particular fuel requirements of the engine.

It is found that engines of the same construction may, due to manufacturing variations, have differing fuel-requirement characteristics and one engine may require more fuel than another to give the same power output. With the arrangement of the invention, by setting of the pre-settable mechanism, it can be arranged that the power control lever and the day temperature trim control have the same settings for a given power output or day temperature respectively irrespective of the fuel requirement characteristic of the engine being controlled.

The power control lever and day temperature trim control may be connected to the engine throttle by a mechanical linkage, and the pre-settable mechanism may in this case comprise a form of pivotal connection between a lever of the linkage and a further part of the linkage which permits variation of the radial distance from the swinging axis of the lever of the point of connection between the lever and the further part, and thus also variation of the displacement of the part of the linkage for a given angular movement of the lever caused by the power control lever or day temperature trim control.

The invention has an important use in connection with multi-engines aircraft since, after the pre-settable mechanisms of all the engines have been adjusted in accordance with their individual fuel-requirement characteristics, the power control levers and temperature trim controls of all have like settings for the same operating conditions, and it is unnecessary for the pilot to make individual adjustments of the trim controls to equalise the power outputs of the engines.

The accompanying drawings illustrate diagrammatically a gas-turbine engine and a fuel system for the engine incorporating the invention. In the drawings:

FIGURE 2 shows in side elevation part of the fuel system control,

FIGURE 3 is a section on the line 3—3 of FIGURE 2, and

FIGURE 4 is a section on the line 4—4 of FIGURE 3.

Figure 1:
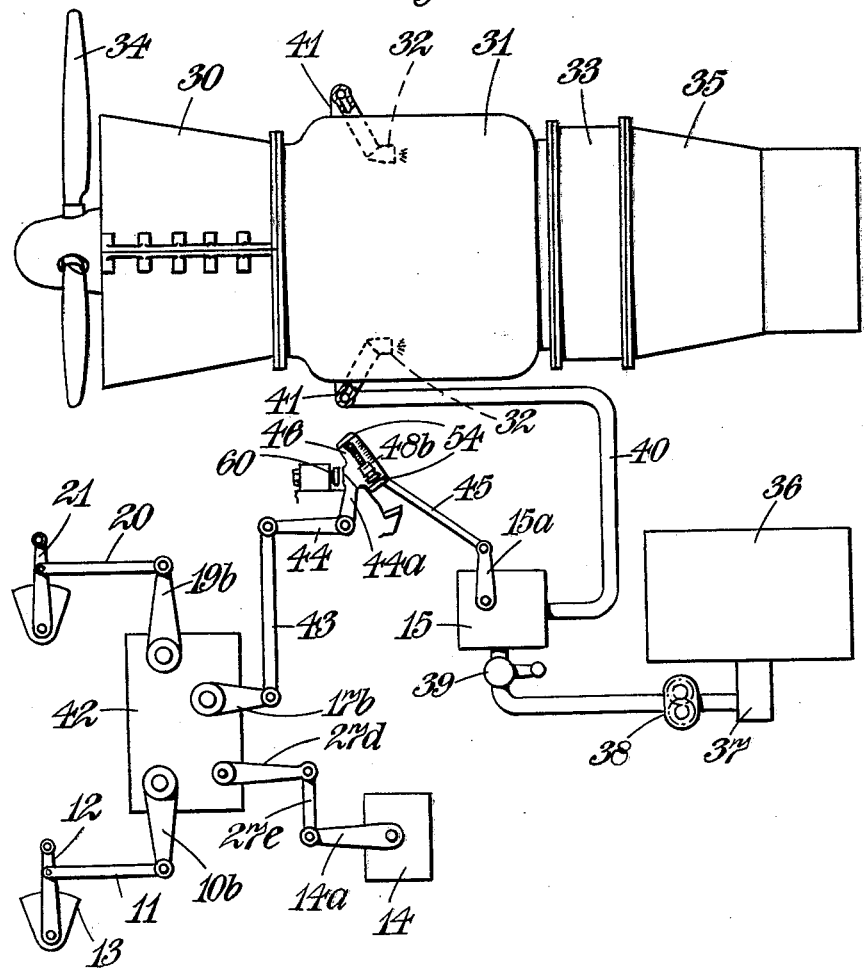
FIGURE 1 shows the engine and its fuel system.

Referring to FIGURE 1, the engine shown is of the propeller-driving kind and comprises a compressor 30, combustion equipment 31 to which fuel is fed by injectors 32 to be burnt with air from the compressor 30, a turbine 33 which drives the compressor 30 and a propeller 34, and an exhaust assembly 35. The compressor 30 will usually have low-pressure and high-pressure sections driven respectively by low-pressure and high-pressure sections of the turbine 33, the low-pressure turbine section also driving the propeller 34 through reduction gearing.

Fuel is fed to the injectors 32 by a fuel system comprising a storage tank 36, booster pump 37, main fuel pump 38, shut-off cock 39 and fuel supply control unit 15 arranged in flow series, fuel leaving the unit 15 being conveyed through pipe 40 to a manifold 41 feeding the injectors 32.

The fuel control unit includes a throttle which is actuated by a lever 15a and it is arranged that the lever 15a may be rocked by a pilot's power control lever 12 and also by a day temperature trim control lever 21, the levers 12, 15a, 21 being interconnected so that, when the lever 21 is set manually in accordance with the day temperature, setting of the lever 12 in a given position in its gate 13 will adjust the lever 15a to give a particular power output. The interconnection between the levers 12, 15a, 21 includes means whereby the fuel system may be pre-set according to the individual fuel-requirement characteristics of the engine, it being understood that, due to manufacturing variations, the quantities of fuel required by engines of the same construction to give a particular power output when operating under the same ambient conditions may differ.

The interconnection between the levers 12, 15a, 21 is in the form of a mechanical linkage. The linkage comprises links 11, 20 connecting the levers 12 and 21 to a device 42 which is a mechanism as described and claimed in British patent specification No. 697,014 (Rolls-Royce Limited) enabling the lever 12 not only to adjust lever 15a but also to adjust a datum-setting lever 14a of a propeller constant speed control unit 14, and enabling lever 21 to adjust lever 15a but to have no effect on the lever 14a. Those parts of the linkage which correspond to parts of the mechanism shown in British patent specification No. 697,014, have the same references as are employed in the prior specification. The link 11 is connected to lever arm 10b of mechanism 42, link 20 is connected to lever arm 19b and lever 14a is connected to lever arm 27d by a link 27e. The mechanism 42 is such that when the pilot's power control lever 12 is in its idling setting, adjustment of lever 21 has only a small or negligible effect on the setting of lever 15a and such that, as lever 12 is moved from its idling setting towards its maximum power setting, adjustment of lever 21 has a progressively greater effect on the adjustment of lever 15a. The day temperature trim lever 21 has the effect of adjusting lever 15a to reduce the fuel supply as it is moved to high day-temperature settings.

The lever 17b is connected by a link 43 to one arm 44 of a bell crank, the other arm 44a of which is connected by link 45 to the throttle lever 15a, and this portion of the linkage includes pre-settable means whereby the movement of lever 15a due to adjustment of levers 12 and 21 may be adjusted to suit the individual fuel-requirement characteristics of the engine.

One form of pre-settable means is shown in detail in FIGURES 2 to 4. The pre-settable means comprises an enlargement 46 at the end of the arm 44a of the bell-crank lever to which link 45 is connected, the enlargement having in it a curved slot 47, the radial distance of which from the pivotal axis of the bell-crank 44, 44a increases from one end of the slot to the other. The slot 47 receives a slide block 48 which has a threaded stem 48a projecting from it to one side of the enlargement 46 and has on its opposite side a head portion 48b containing a threaded hole 48c.

The stem 48a carries a washer 49, a spherical-surfaced bush 50 and a clamping nut 51 which is locked in position by a split pin 52, the bush 50 being engaged in a spherical-surfaced hole 45a in the link 45. The bush 50 and hole 45a provide a universal connection between the slide block 48 and the link 45.

The threaded hole 48c is engaged by a bolt 53 extending with limited longitudinal freedom between a pair of walls 54 projecting from the enlargement 46 adjacent the ends of the slot 47. The bolt 53 has a head 53a by which it can be rotated when nut 51 is loosened and also carries a lock nut 55. Clearly, on rotation of bolt 53, the block 48 is adjusted along the slot 47 so varying the radial distance of the point of connection between the link 45 and lever arm 44a from the axis of the bell crank, and also varying the longitudinal displacement of link 45 for a given angular movement of arm 44a.

The enlargement 46 has a scale 56 inscribed on it and the block 48 has inscribed on it a co-operating mark 57. Instead of providing the mark 57 the edge of the block may be used.

The enlargement 46 co-operates for setting purposes with an adjustable abutment 59 on fixed structure 58. The abutment 59 is employed during initial setting of the connection between arm 44a and link 45.

In order to pre-set the connection, the block 48 is locked with mark 57 on the zero scale 56 and the bell crank is set to a position which it occupies for maximum power setting of lever 12 and zero day temperature trim setting of lever 21, in which position the enlargement 46 is clear of the abutment 59 by a predetermined amount which is obtained by inserting a spacer 60 of suitable thickness behind the abutment 59. The engine is then run in a test rig and the individual fuel requirement of the engine for take-off, i.e. desired maximum power operation, under I.S.A. conditions, that is under atmospheric temperature conditions requiring a particular setting of the day temperature trim lever, is determined. The mechanic now consults a chart correlating the fuel requirement for take-off with the readings of scale 56, and adjusts the position of block 48 until the mark 57 registers with the reading on the scale 56 appropriate to the determined I.S.A. fuel requirement of the engine and then locks the block 48 and tightens the lock nut 55. The resulting setting of lever 15a, and thus of the engine throttle, will result in a fuel flow to the engine appropriate to give the desired maximum power output.

A second stop 61 is provided to limit movement of the bellcrank in the clockwise direction so as to avoid damage to parts of the mechanism due to excessive rocking of the bell-crank when either link 45 or link 43 is disconnected.

The arrangement just described has an important advantage in connection with multi-engine aircraft since once the pre-settable mechanisms of the individual engines have been adjusted as above described, the pilot's power levers 12 and the day temperature trim levers 21 of all the engines can be set in the same angular positions in their gates to obtain equal power outputs from all engines.

The control, in addition to being arranged to operate as above described, may incorporate a mechanism as set forth in British application No. 22728/58, so that the lever 21 operates a number of separate controls in sequence by movement in successive ranges of its total range of movement.

I claim:
1. A gas turbine engine fuel system comprising an engine throttle adjustable to vary the fuel flow to the engine, a power control lever settable to select the desired power output of the engine, means connecting said power control lever to said engine throttle and transmitting setting adjustments of the power control lever to adjust the engine throttle, a day temperature trim control adjustable in a plurality of settings in accordance with day temperature, said day temperature trim control being connected to adjust said means in the sense to vary the effect of setting adjustment of the power control lever on the engine throttle, said means including a pre-settable mechanism which is adjustable to vary the effects of both the power control lever and the day temperature trim control on the engine throttle lever, said pre-settable mechanism being set in accordance with the particular fuel requirements of the engine, said means being a mechanical linkage including a lever having a swinging axis and a further part pivoted to the lever, the pre-settable mechanism forming the pivotal connection between said lever of the linkage and said part of the linkage and on adjustment varying the radial distance between the swinging axis of the lever and the point of connection between the lever and the further part, and thus also variation of the displacement of the part of the linkage for a given angular movement of the lever, the power control lever and the day temperature trim control being connected to effect swinging of the lever of the linkage and the engine throttle being connected to be adjusted by the further part, said pivotal connection comprising an enlargement on said lever of the linkage, said enlargement having a curved slot whereof the radial distance from the swinging axis increases from one end of the slot to the other, a slide block slidably engaged in the slot and having a universal connection with said further part of the linkage, and locking means permitting the slide block to be locked to the enlargement in any position of adjustment along the slot.

2. A gas turbine engine fuel system according to claim 1, said slide block having therein a threaded hole, said enlargement having a pair of walls adjacent the ends of the slot therein, said locking means comprising a bolt engaging the threaded hole and extending with limited freedom between said walls so that the block is adjusted lengthwise of the slot by rotation of the bolt and a lock nut on the bolt, and said universal connection between said slide block and said further part of the linkage comprising a threaded stem on the slide block, a clamping nut engaging the threaded stem, a spherical-surfaced bush on said stem between the clamping nut and the slide block, said bush being engaged in a spherical-surfaced hole in said further part of the linkage.

References Cited in the file of this patent
UNITED STATES PATENTS

| | | |
|---|---|---|
| 1,914,943 | Dunnell | June 20, 1933 |
| 2,106,945 | Francis | Feb. 1, 1938 |
| 2,296,485 | Whitworth | Sept. 22, 1942 |
| 2,737,015 | Wright | Mar. 6, 1956 |
| 2,779,422 | Dolza | Jan. 20, 1957 |
| 2,802,335 | Skellern | Aug. 13, 1957 |

FOREIGN PATENTS

| | | |
|---|---|---|
| 697,014 | Great Britain | Sept. 16, 1953 |